United States Patent Office 2,993,044
Patented July 18, 1961

2,993,044
DIUREIDES AND METHOD FOR THEIR PREPARATION
Fred Applegath and Raymond A. Franz, El Dorado, Ark., assignors to Monsanto Chemical Company, St. Louis, Mo., a corporation of Delaware
No Drawing. Filed Dec. 19, 1958, Ser. No. 781,432
15 Claims. (Cl. 260—247.2)

The present invention relates to a new and improved method for preparing diureides, and to certain new compounds of this class so prepared.

The compounds of this invention are represented by the following formulas:

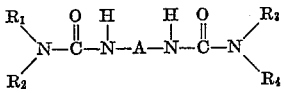

and

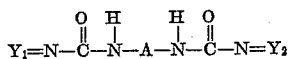

wherein $R_1$, $R_2$, $R_3$ and $R_4$ represent an aliphatic radical, $Y_1$ and $Y_2$ represent an aliphatic group which, combined with the nitrogen, forms a heterocyclic radical and A represents an aromatic radical having the two nitrogen atoms shown in the formula attached to different aromatic nuclear carbon atoms which are separated from each other by at least one other aromatic nuclear carbon atom. The diureides of this invention are prepared by reacting carbon monoxide, sulfur, an aromatic diamine wherein the two amino groups are attached to different aromatic nuclear carbon atoms which are separated from each other by at least one other aromatic nuclear carbon atom, and a secondary amine selected from amines represented by the following formulas:

and

wherein $R_5$ and $R_6$ represent an aliphatic radical and $Y_3$ represents an aliphatic group, which combined with the nitrogen, forms a heterocyclic radical. The diureides are obtained in good yields and a high state of product purity in this one-step reaction. The following examples illustate this invention.

Example 1

A mixture of 21.6 grams (0.2 mole) of p-phenylene diamine, 54.0 grams (1.2 moles) dimethylamine, 25.6 grams (0.8 mole) sulfur and 50 ml. methanol was placed in a 1 liter stainless steel autoclave provided with a magnetic agitator. The autoclave was then charged with 328 p.s.i.g. carbon monoxide. The autoclave was closed and heated for a period of two hours at 100° C. At the end of the heating period the reactor was vented, chilled and opened. The contents of the reactor were washed with methanol. The resulting mixture was heated for approximately one hour and filtered while hot. The resdue from the filtration was then washed with hot methanol until the washings were colorless. Forty-five grams of white solid were recovered and recrystallized from dimethyl formamide. A second crop of 2.55 grams was recovered for a total yield of 93% of theoretical. Melting point 370° C. The compound prepared was identified by a carbon, hydrogen and nitrogen-analysis as 1,4-bis(3,3-dimethylureido)benzene.

Example 2

Proceeding in the manner described in Example 1, 40.5 grams (0.2 mole) benzidine, 36.0 grams (0.8 mole) of dimethylamine, 50 ml. of methanol and 19.2 grams (0.6 mole) sulfur were placed in the 1-liter autoclave which was charged with 450 p.s.i.g. carbon monoxide. Practically a theoretical yield of the compound 4,4'-bis(3,3,-dimethylureido)diphenyl was obtained after recrystallization of the crude product from dimethyl formamide. The melting point was above 360° C. The identity of the compound was verified by a carbon-hydrogen-nitrogen analysis.

Example 3

Proceeding in the manner described in Example 1, the compound bis(3,3-dimethylureido-4-phenyl)methane was prepared by reacting 39.6 grams (0.2 mole) p,p'-methylene dianiline, 36.0 grams (0.8 mole) dimethylamine and 19.2 grams (0.6 mole) sulfur in the presence of 50 ml. of solvent methanol. The reactor autoclave was charged with 450 p.s.i.g. carbon monoxide. 66.9 grams of crude product were obtained representing a 98.6% yield. The product was recrystallized from a water-methanol solution and after recrystallization had a melting point of 345° C. The identity of the compound was verified by a carbon-hydrogen-nitrogen analysis.

Example 4

With the same equipment and procedure described in Example 1, a mixture of 21.6 grams (0.2 mole) of p-phenylene diamine, 67.7 grams (0.8 mole) morpholine, 19.2 grams (0.6 mole) sulfur and 50 ml. methanol was placed in the autoclave which was then charged with 450 p.s.i.g. carbon monoxide. The reaction mixture was heated for two hours at 120° C. An 83% yield of the compound 1,4-bis(4-morpholinocarboxamido)benzene was obtained having a melting point of 324° C. (with decomposition). The identity of the compound was confirmed by carbon-hydrogen-nitrogen analysis.

Example 5

Using the same equipment and procedure described in Example 1, the compound 1,4-bis(1-piperidinocarboxamido)benzene was prepared as follows: A mixture of 21.6 grams (0.2 mole) of p-phenylene diamine, 68.1 grams (0.6 mole) piperidine, 19.2 grams (0.6 mole) sulfur and 50 ml. of methanol was heated for two hours at 100° C. The reaction was carried out in the presence of carbon monoxide under an intital pressure of 450 p.s.i.g. Fifty-eight grams, representing an 89% yield of the diureido, was obtained having a melting point of above 360° C. The identity of the compound was confirmed by a carbon-hydrogen-nitrogen analysis.

Example 6

The procedure set forth in Example 1 is repeated using 0.2 mole of 1,4-diamino-2,5-dichlorobenzene, 0.6 mole of 3,5-dimethyl-hexahydrotriazine, 0.6 mole of sulfur and 50 ml. of methanol. These materials are charged to the reactor and the reactor then pressured with carbon monoxide to an initial pressure of 450 p.s.i.g. The reaction is carried out at a tempearture of approximately 120° C. From this reaction mixture a good yield of 1,4-bis(3,5-dimethylhexahydrotriazylcarboxamido) - 2,5 - dichlorobenzene is obtained.

Example 7

The procedure set forth in Example 1 is repeated using 0.2 mole of 1,3-diamino-5,6-dibromobenzene, 0.6 mole of 4-methyl-hexahydrodiazine, 0.6 mole of sulfur and 50 ml. of methanol. These materials are charged to the reactor and the reactor then pressured with carbon monoxide to an initial pressure of 450 p.s.i.g. The reaction is carried out at a temperature of approximately 120° C. From this reaction mixture a good yield of 1,3-bis(4- methylhexahydrodiazylcarboxamido) - 5,6 - dibromobenzene is obtained.

Example 8

The procedure set forth in Example 1 is repeated using 0.2 mole of 1,3-diamino-4-methylaminobenzene, 0.6 mole of 4-tetrahydrothiazine, 0.6 mole of sulfur and 50 ml. of methanol. These materials are charged to the reactor and the reactor then pressured with carbon monoxide to an initial pressure of 450 p.s.i.g. The reaction is carried out at a temperature of approximately 120° C. From this reaction mixture a good yield of 1,3-bis(4-tetrahydrothiazylcarboxamido)-4-methylaminobenzene is obtained.

Example 9

The procedure set forth in Example 1 is repeated using 0.2 mole of 1,4-diamino-3-vinylbenzene, 0.6 mole of tetrahydroquinoline, 0.6 mole of sulfur and 50 ml. of methanol. These materials are charged to the reactor and the reactor then pressured with carbon monoxide to an initial pressure of 450 p.s.i.g. The reaction is carried out at a temperature of approximately 120° C. From this reaction mixture a good yield of 1,4-bis(tetrahydroquinolylcarboxamido)-3-vinylbenzene is obtained.

Example 10

The procedure set forth in Example 1 is repeated using 0.2 mole of 1,4-diamino-3-phenylbenzene, 0.6 mole of tetrahydroisoquinoline, 0.6 mole of sulfur and 50 ml. of methanol. These materials are charged to the reactor and the reactor then pressured with carbon monoxide to an initial pressure of 450 p.s.i.g. The reaction is carried out at a temperature of approximately 120° C. From this reaction mixture a good yield of 1,4-bis(tetrahydroisoquinolylcarboxamido)-3-phenylbenzene is obtained.

Example 11

The procedure set forth in Example 1 is repeated using 0.2 mole of 1,3-diamino-4-cyclohexylbenzene, 0.6 mole of di-n-butylamine, 0.6 mole of sulfur and 50 ml. of methanol. These materials are charged to the reactor and the reactor then pressured with carbon monoxide to an initial pressure of 450 p.s.i.g. The reaction is carried out at a temperature of approximately 120° C. From this reaction mixture a good yield of 1,3-bis(3,3-di-n-butylureido)-4-cyclohexylbenzene is obtained.

Example 12

The procedure set forth in Example 1 is repeated using 0.2 mole of 2,7-diamino-9-phenanthrenethiol, 0.6 mole of di-iso-octylamine, 0.6 mole of sulfur and 50 ml. of methanol. These materials are charged to the reactor and the reactor then pressured with carbon monoxide to an initial pressure of 450 p.s.i.g. The reaction is carried out at a temperature of approximately 120° C. From this reaction mixture a good yield of 2,7-bis(3,3-di-iso-octylureido)-9-phenanthrenethiol is obtained.

Example 13

The procedure set forth in Example 1 is repeated using 0.2 mole of 2-hydroxy-2'-methyl-4,4'-diaminodiphenyl, 0.6 mole of di-n-dodecylamine, 0.6 mole of sulfur and 50 ml. of methanol. These materials are charged to the reactor and the reactor then pressured with carbon monoxide to an initial pressure of 450 p.s.i.g. The reaction is carried out at a temperature of approximately 120° C. From this reaction mixture a good yield of 4,4'-bis(3,3-di-n-dodecylureido)-2-hydroxy-2'-methyldiphenyl is obtained.

Example 14

The procedure set forth in Example 1 is repeated using 0.2 mole of di-4-aminophenyl-methylamine, 0.6 mole of dimethylamine, 0.6 mole of sulfur and 50 ml. of methanol. These materials are charged to the reactor and the reactor then pressured with carbon monoxide to an initial pressure of 450 p.s.i.g. The reaction is carried out at a temperature of approximately 120° C. From this reaction mixture a good yield of bis(3-3-dimethylureido-4-phenyl)methylamine is obtained.

Example 15

The procedure set forth in Example 1 is repeated using 0.2 mole of 1,4-diamino-6-cyanonaphthalene, 0.6 mole of di-n-octadecylamine, 0.6 mole of sulfur and 50 ml. of methanol. These materials are charged to the reactor and the reactor then pressured with carbon monoxide to an initial pressure of 450 p.s.i.g. The reaction is carried out at a temperature of approximately 120° C. From this reaction mixture a good yield of 1,4-bis(3,3-di-n-octadecylureido)-6-cyanonaphthalene is obtained.

Example 16

The procedure set forth in Example 1 is repeated using 0.2 mole of 1,8-diaminoacridine, 0.6 mole of di-tert-butylamine, 0.6 mole of sulfur and 50 ml. of methanol. These materials are charged to the reactor and the reactor then pressured with carbon monoxide to an initial pressure of 450 p.s.i.g. The reaction is carried out at a temperature of approximately 120° C. From this reaction mixture a good yield of 1,8-bis(3,3-di-tert-butylureido)acridine is obtained.

Example 17

The procedure set forth in Example 1 is repeated using 0.2 mole of 4,4'-diamino-2,2'-dicarboxydiphenyl, 0.6 mole of dimethylamine, 0.6 mole of sulfur and 50 ml. of methanol. These materials are charged to the reactor and the reactor then pressured with carbon monoxide to an initial pressure of 450 p.s.i.g. The reaction is carried out at a temperature of approximately 120° C. From this reaction mixture a good yield of 4,4'-bis(3,3-dimethylureido)-2,2'-dicarboxydiphenyl is obtained.

Example 18

The procedure set forth in Example 1 is repeated using 0.2 mole of 4,4'-diamino-2,2'-dicarbethoxydiphenyl, 0.6 mole of dimethylamine, 0.6 mole of sulfur and 50 ml. of methanol. These materials are charged to the reactor and the reactor then pressured with carbon monoxide to an initial pressure of 450 p.s.i.g. The reaction is carried out at a temperature of approximately 120° C. From this reaction mixture a good yield of 4,4'-bis(3,3-dimethylureido)-2,2'-carbethoxydiphenyl is obtained.

Substantial variation from the conditions set forth in the examples is possible in the practice of this invention. Generally, a mixture comprising an inert diluent, sulfur, an aromatic diamine and a secondary aliphatic amine or heterocyclic amine, together with carbon monoxide are charged to a pressure reactor equipped with an agitator. The reaction is preferably carried out at about 100° C. to 120° C., although the reaction will proceed at temperatures as low as 70° C. and as high as 300° C. or even higher, and at carbon monoxide pressures as low as 50 p.s.i. In the present process we prefer an initial room temperature carbon monoxide pressure of about 250–600 p.s.i. No further pressure need be applied during the course of the reaction.

Although a solvent or diluent is not essential, as indicated, we prefer to employ an amount at least sufficient to slurry the reactants. Methanol is preferred because it is easy to separate and recover from the product compound. It is also preferable, but not necessary, to have a diluent in which the reactants are soluble. Other suitable diluents are petroleum ether, mineral oil, benzene, ligroin, ethylene glycol, formamide, N,N-dimethylaniline, pyridine, etc.

The time required to obtain good yields of the desired diureido compound by our process is related to reaction temperature. In the apparatus used in the examples, a reaction time of about two hours at a temperature of 100° C. to 120° C. was found to be adequate to obtain maximum yields of the desired diureido compound. Reaction time is not critical, and can be adjusted in accordance with reaction temperature.

The pressures employed in the process of this invention as indicated are best defined as the initial carbon monoxide pressure as measured at room temperature. With a given apparatus, the mol ratio of carbon monoxide to the aromatic diamine will increase as the CO pressures increase; however, as long as this mol ratio is at least 1 to 1 it is not critical.

The quantities of reactants used in this process are not critical. In general, at least stoichiometric proportions of reactants should be used, that is a molar ratio of aromatic diamine: carbon monoxide: sulfur: secondary amine of at least 1:2:2:2. Excessive quantities of any of the reactants can be used if desired.

A by-product of the reaction of the present invention is hydrogen sulfide. It is desirable to recover for re-use the sulfur value of the hydrogen sulfide, e.g. by any well-known means such as the partial oxidation method.

Unreacted amines may also be recovered for re-use if desired. The lower boiling amines may be recovered from the reaction product mixture by a fractional distillation. The higher boiling amines may be recovered by solvent extraction of mother liquor remaining after crystallization of the product, and also by solvent extraction of the crude product.

Any aromatic diamine wherein the amino groups are attached to different aromatic nuclear carbon atoms which are separated from each other by at least one other aromatic nuclear carbon atom can be used in the process of this invention. Such aromatic diamines can be unsubstituted or nuclearly substituted with one or more substituent groups which are not deleteriously reactive under the conditions of the reaction. By the expression "groups which are not deleteriously reactive under the conditions of the reaction" is meant groups which do not prevent the formation of any of the desired diureide. Such substituents groups include alkyl, aryl, cycloalkyl, alkenyl, carboxy, hydroxy, thiol, cyano, halogen, including chlorine, bromine, fluorine and iodine, alkoxy, aryloxy, organosilyl, polysiloxanyl, alkylamino, dialkylamino, etc.

The secondary amine which can be employed in the practice of this invention may be described in more detail by the general formulas and 

wherein $R_5$ and $R_6$ represent acyclic, alicyclic and heterocyclic aliphatic radicals; and $Y_3$ represents an aliphatic group which in conjunction with the nitrogen atom forms a heterocyclic radical. Such radicals include alkyl, cycloalkyl, alkenyl, 5-membered and 6-membered heterocyclic radicals having at least one atom in the ring selected from oxygen, sulfur and nitrogen. Such radicals as these can be unsubstituted or substituted with one or more substituent groups which are not deleteriously reactive under the conditions of the reaction. By the expression "groups which are not deleteriously reactive under the conditions of the reaction" is meant groups which do not prevent the formation of any of the desired diureide. Such substituent groups include alkyl, aryl, cycloalkyl, alkenyl, carboxy, hydroxy, thiol, cyano, halogen, including chlorine, bromine, fluorine and iodine, alkoxy, aryloxy, organosilyl, polysiloxanyl, alkylamino, dialkylamino, etc.

As indicated, the diureides described herein are new compounds. Certain monosubstituted diureido compounds are known to the prior art. However, the tetra substituted compounds described in the preceding examples and represented by the general formulas heretofore set forth, are not disclosed by the prior art to the best of our knowledge.

The compounds of the present invention have a wide range of uses and applications. They are useful in preparing polyureas having fiber forming properties. The diureides of this invention are characterized by high melting points and excellent high temperature stability. Lubricating oils having incorporated therein minor amounts of the diureides of this invention are characterized by highly improved high temperature stability.

The diureides of this invention are also excellent thickeners for high temperature greases. A grease thickened with a diureide of this invention according to well known techniques was subjected to the bicycle bearing test run at 1800 r.p.m. The grease showed only an 8% loss of lubricant at 235° F. after 3 hours.

The diureides of this invention are lubricants in themselves and can be used as the sole lubricant in many high temperature applications.

This application is a continuation-in-part of application Serial No. 611,351, filed September 21, 1956, now abandoned.

What is claimed is:

1. A process for preparing diureido compounds which comprises reacting carbon monoxide and sulfur with an aromatic diamine wherein the two amino groups are attached to different aromatic nuclear carbon atoms which are separated from each other by at least one other aromatic nuclear carbon atom, and a secondary amine selected from the group represented by the following formulas

and 

wherein $R_5$ and $R_6$ represent an aliphatic radical and $Y_3$ represents a saturated aliphatic group, which combined with the nitrogen of the radical forms a heterocyclic radical.

2. A process for preparing diureido compounds which comprises mixing together sulfur, an aromatic diamine wherein the two amino groups are attached to different aromatic nuclear carbon atoms which are separated from each other by at least one other aromatic nuclear carbon atom, a secondary amine selected from the group represented by the following formulas

and 

wherein $R_5$ and $R_6$ represent an aliphtic radical and $Y_3$ represents a saturated aliphatic group, which combined with the nitrogen of the radical forms a heterocyclic radical, and carbon monoxide and heating said mixture while under a pressure above atmospheric pressure to directly form a diureido compound.

3. A process as described in claim 2 wherein the reaction is carried out in an inert diluent.

4. A process as described in claim 3 wherein the reaction is carried out at a temperature within the range from about 70° C. to about 300° C.

5. A process for preparing the compound 1,4-bis(3,3-dimethylureido)benzene which comprise mixing together p-phenylene diamine, dimethylamine, sulfur, and methanol in the presence of carbon monoxide, heating said mixture while under superatmospheric pressure to directly form said diureido compound.

6. A process for preparing the compound 4,4'-bis(3,3-dimethylureido)diphenyl which comprises mixing together benzidene, dimethylamine, sulfur and methanol in the presence of carbon monoxide, heating said mixture while under superatmospheric pressure to directly form said diureido compound.

7. A process for preparing the compound bis(3,3-dimethylureido-4-phenyl)methane which comprises mixing together p,p'-methylene-dianiline, dimethylamine sulfur and methanol in the presence of carbon monoxide, heating said mixture while under superatmospheric pressure to directly form said diureido compound.

8. A process for preparing the compound 1,4-bis(4 morpholinocarboxamido)benzene which comprises mixing together p-phenylenediamine, morpholine, sulfur, and methanol in the presence of carbon monoxide, heating said mixture while under superatmospheric pressure to directly form said diureido compound.

9. A process for preparing the compound 1,4-bis(1-piperidinocarboxamido)benzene which comprises mixing together p-phenylenediamine, piperidine, sulfur, and methanol in the presence of carbon monoxide, heating the resultant mixture while under superatmospheric pressure to directly form said diureido compound.

10. A diureido compound having a general formula selected from the group consisting of

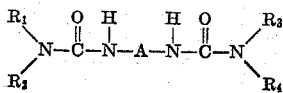

and

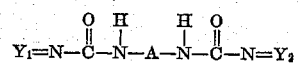

wherein $R_1$, $R_2$, $R_3$ and $R_4$ represent an aliphatic radical, $Y_1$ and $Y_2$ represent a saturated aliphatic group which, combined with the nitrogen, forms a heterocyclic radical and A represents an aromatic radical having the two nitrogen atoms shown in the formula attached to different aromatic nuclear carbon atoms which are separated from each other by at least one other aromatic nuclear carbon atom.

11. The compound 1,4-bis(3,3-dimethylureido)benzene.

12. The compound 4,4'-bis(3,3-dimethylureido)diphenyl.

13. The compound bis(3,3-dimethylureido-4-phenyl)methane.

14. The compound 1,4-bis(4-morpholinocarboxamido)benzene.

15. The compound 1,4-bis(1-piperidinocarboxamido)benzene.

References Cited in the file of this patent

UNITED STATES PATENTS

| | | |
|---|---|---|
| 2,714,117 | Lacey et al. | July 26, 1955 |
| 2,857,430 | Applegath et al. | Oct. 21, 1958 |